(12) United States Patent
Smith et al.

(10) Patent No.: US 10,306,833 B2
(45) Date of Patent: Jun. 4, 2019

(54) MOWER DECK WITH A THREE-DIMENSIONAL SINGLE BELT TRANSMISSION

(71) Applicant: KUBOTA CORPORATION, Osaka (JP)

(72) Inventors: Phillip Smith, Gainesville, GA (US); Benjamin A. Morris, Gainesville, GA (US); Fahmid Sharkar, Atlanta, GA (US); Eric Chang, Gainesville, GA (US)

(73) Assignee: KUBOTA CORPORATION, Osaka (JP)

( * ) Notice: Subject to any disclaimer, the term of this patent is extended or adjusted under 35 U.S.C. 154(b) by 388 days.

(21) Appl. No.: 15/346,044

(22) Filed: Nov. 8, 2016

(65) Prior Publication Data

US 2018/0125006 A1    May 10, 2018

(51) Int. Cl.
*A01D 34/76* (2006.01)
*A01D 67/04* (2006.01)
*B60N 2/38* (2006.01)

(52) U.S. Cl.
CPC ............. *A01D 34/76* (2013.01); *A01D 67/04* (2013.01); *B60N 2/38* (2013.01)

(58) Field of Classification Search
CPC .......... B60N 2/38; A01D 34/76; A01D 34/63; A01D 34/64; A01D 34/66; A01D 34/685; A01D 34/83; A01D 34/831; A01D 2101/00; A01D 67/04
See application file for complete search history.

(56) References Cited

U.S. PATENT DOCUMENTS

| | | | | |
|---|---|---|---|---|
| 2,872,831 A * | 2/1959 | Wood | ..................... | A01D 34/76 474/62 |
| 3,680,292 A * | 8/1972 | McCanse | ............... | A01D 34/64 56/15.3 |
| 3,774,464 A * | 11/1973 | McCanse | ............... | A01D 34/76 474/135 |
| 4,231,215 A * | 11/1980 | Klas | ....................... | A01D 34/30 56/11.6 |
| 5,214,906 A * | 6/1993 | Saki | ..................... | A01D 34/685 56/13.6 |
| 6,176,071 B1 * | 1/2001 | Thorman | ............... | A01D 34/76 474/135 |
| 7,913,479 B2 * | 3/2011 | Eavenson, Sr. | ........ | A01D 34/76 474/135 |
| 9,750,184 B2 * | 9/2017 | Reichard | ................ | A01D 34/76 |
| 2018/0292001 A1 * | 10/2018 | Aoki | ...................... | F16H 59/06 |

* cited by examiner

*Primary Examiner* — Alicia Torres
*Assistant Examiner* — Adam J Behrens
(74) *Attorney, Agent, or Firm* — Greenblum & Bernstein, P.L.C.

(57) ABSTRACT

[Summary] A mower unit includes an idler pulley unit and a single belt routed around an output pulley of a drive source, the idler pulley unit and a plurality of blade pulleys. The idler pulley unit includes a first idler pulley, a second idler pulley and a tension idler pulley. A pulley height of the idler pulley unit is set higher than a pulley height of the blade pulleys, and a forward belt portion from the output pulley and a reverse belt portion to the output pulley extend to pass over and above the blade belt portion.

10 Claims, 13 Drawing Sheets

MOWER DECK WITH A THREE-DIMENSIONAL SINGLE BELT TRANSMISSION

TECHNICAL FIELD

The present invention relates to a mower unit which mounts on a traveling vehicle such as a tractor and relates also to a mower machine having such mower unit mounted thereto.

BACKGROUND ART

A mower unit includes a plurality of blades for securing a greater mowing width, so that rotational axis of the plurality of blades extends upwardly of a mower deck. For rotation of the blades, power of a power generating unit such as an engine is utilized. A mower unit disclosed in U.S. Patent Application Publication No. 6176071 employs a belt power transmission mechanism for power transmission, including a first belt transmission mechanism for transmitting rotation of an output pulley of a power generating unit to one blade rotational shaft and a second belt transmission mechanism for transmitting rotation of this blade rotational shaft to another blade rotational shaft. An idler pulley is provided for applying tension by means of a spring to both the first belt transmission mechanism and the second belt transmission mechanism. With provision of the two belt transmission mechanisms, stable power transmission is sought for. However, the presence of the two belt transmission mechanisms is problematic in the respects of cost and space required therefor.

A grass mower machine having only one belt transmission mechanism is disclosed in U.S. Patent Application Publication No. 8763355. According to this grass mower machine, a length of belt entrained around an output pulley mounted on an engine output shaft extends to a mower unit which is disposed on a front side of a machine body and this belt is then changed in direction firstly by two idler pulleys (a fixed idler pulley and a pivotal idler pulley) to a left-right direction of the machine body to be routed around a plurality of blade pulleys. In this arrangement, the distance between the output pulley and the idler pulleys for change of direction is relatively short. So, in the event of lifting up/down of the mower unit by a large stroke, the tilting of the belt portion entrained around the output pulley is large, so there is the possibility of the load applied to its belt portion becoming significant.

SUMMARY

Thus, there is a need for improvement in layout of the blade pulley and the idler pulley in a mower unit implementing a belt transmission mechanism.

A mower unit according to the present invention is configured such that power is transmitted from an output pulley of a power source. The mower unit comprises:

a mower deck liftable up/down by a lift mechanism;
a plurality of blade rotational shafts extending through a top plate of the mower deck perpendicularly;
a plurality of blade pulleys mounted on the respective blade rotational shafts; and
an idler pulley unit and
a single belt routed around the output pulley, the idler pulley unit and the blade pulleys.

The idler pulley unit includes a first idler pulley, a second idler pulley and a tension idler pulley. The single belt includes a forward belt portion coupling the output pulley with the tension idler pulley, a reverse belt portion coupling the output pulley with the idler pulley unit, and a blade belt portion coupling the idler pulley unit with the blade pulleys. A pulley height of the idler pulley unit is set higher than a pulley height of the blade pulleys, and the forward belt portion and the reverse belt portion extend to pass over and above the blade belt portion.

With the mower unit configured as described above, since the blade belt portion routed around the blade pulleys is changed in direction by the three pulleys of the idler pulley unit, there is obtained greater freedom in the routing of the belt. In particular, with the three-dimensional belt routing arrangement of the forward belt portion and the reverse belt portion extending to pass over and above the blade belt portion, there is achieved greater freedom in the routing of the belt. Thus, it is possible to employ a layout suffering less mechanical load between the blade belt portion and the respective pulleys. As a result, the service lives of the belt and the pulleys can be extended. Moreover, if the blade pulleys are disposed between the output pulley and the idler pulley unit, there can be secured a long distance between the output pulley and the idler pulley unit for change of direction of the belt. This will contribute to increase of the lift stroke of the mower unit without providing any inconvenience to belt power transmission.

For allowing a portion of the belt to pass over and above the remaining portion thereof, a particular portion of the belt is to be tilted. A load due to such tilting of the belt can be reduced by tilting a pulley support shaft of the idler pulley around which the tilted belt portion is to be routed.

The idler pulley unit includes an idler pulley (tension pulley) which is movable in such a manner to increase a running length of the belt. Then, by setting a moving direction of this movement of the tension pulley for increasing the running length of the belt to be oriented toward an outer side of the mower deck, the problem relating to space associated with the pulley movement can be reduced.

The present invention comprises also a mower machine with the above-described mower unit mounted thereto.

EMBODIMENT

Figure 1:
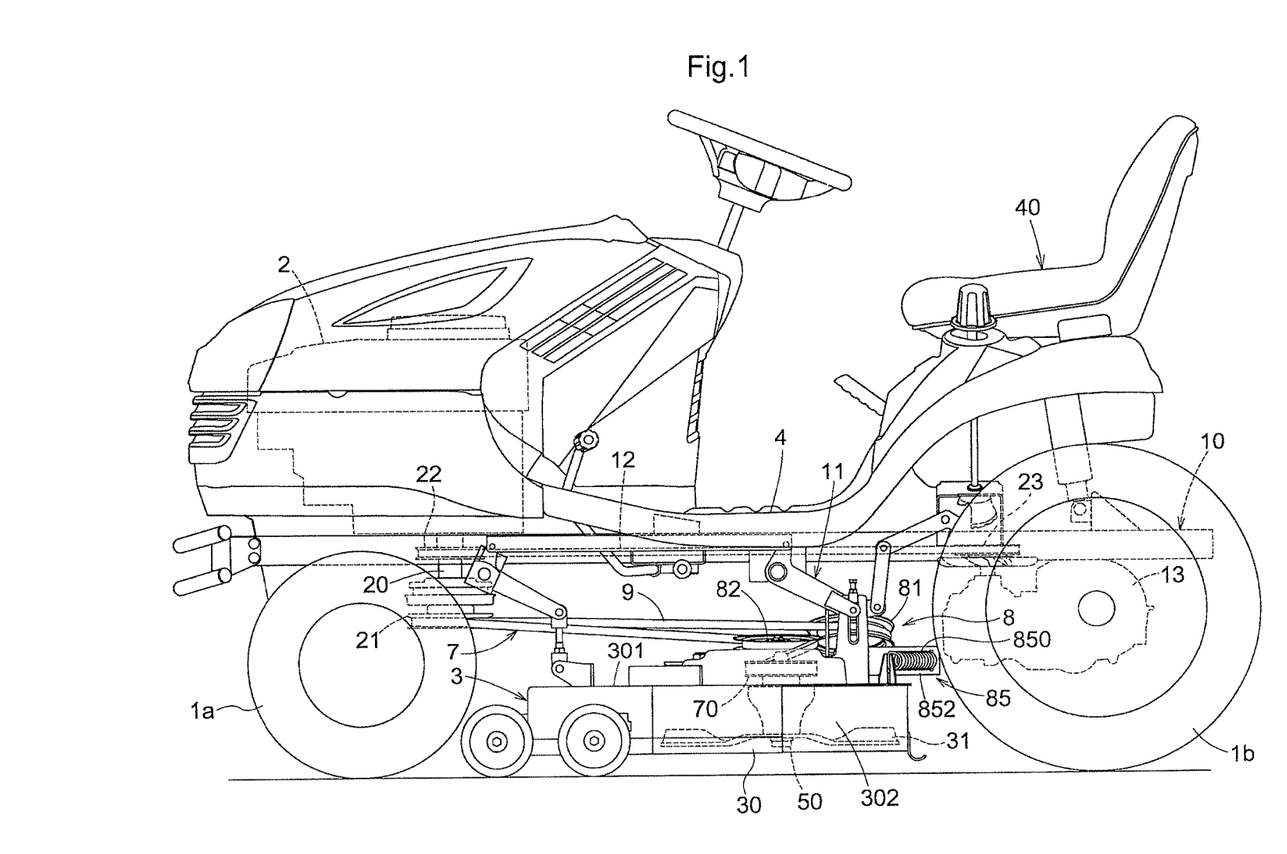
FIG. 1 is a side view showing one embodiment of a mower machine having an inventive mower unit mounted thereto.

Next, a specific embodiment of the present invention will be explained with reference to accompanying drawings. Here, a mower unit 3 relating to the present invention is mounted on a grass mower vehicle as shown in FIG. 1. This grass mower vehicle includes a traveling vehicle body 10 supported by a pair of left and right front wheels 1a and a pair of left and right rear wheels 1b. In this disclosure, unless indicated otherwise, a language "front" refers to the front side relating to a vehicle body front-rear direction (traveling direction) and a language "rear" refers to the rear side relating to the vehicle body front-rear direction (traveling direction). Further, a left-right direction or a lateral direction means a vehicle body transverse direction (vehicle body width direction) perpendicular to the vehicle body front-rear direction. And, a language "upper" or "lower refers to a positional relation in a vehicle body perpendicular direction (vertical direction) and denotes a relation respecting the ground height.

Figure 2:
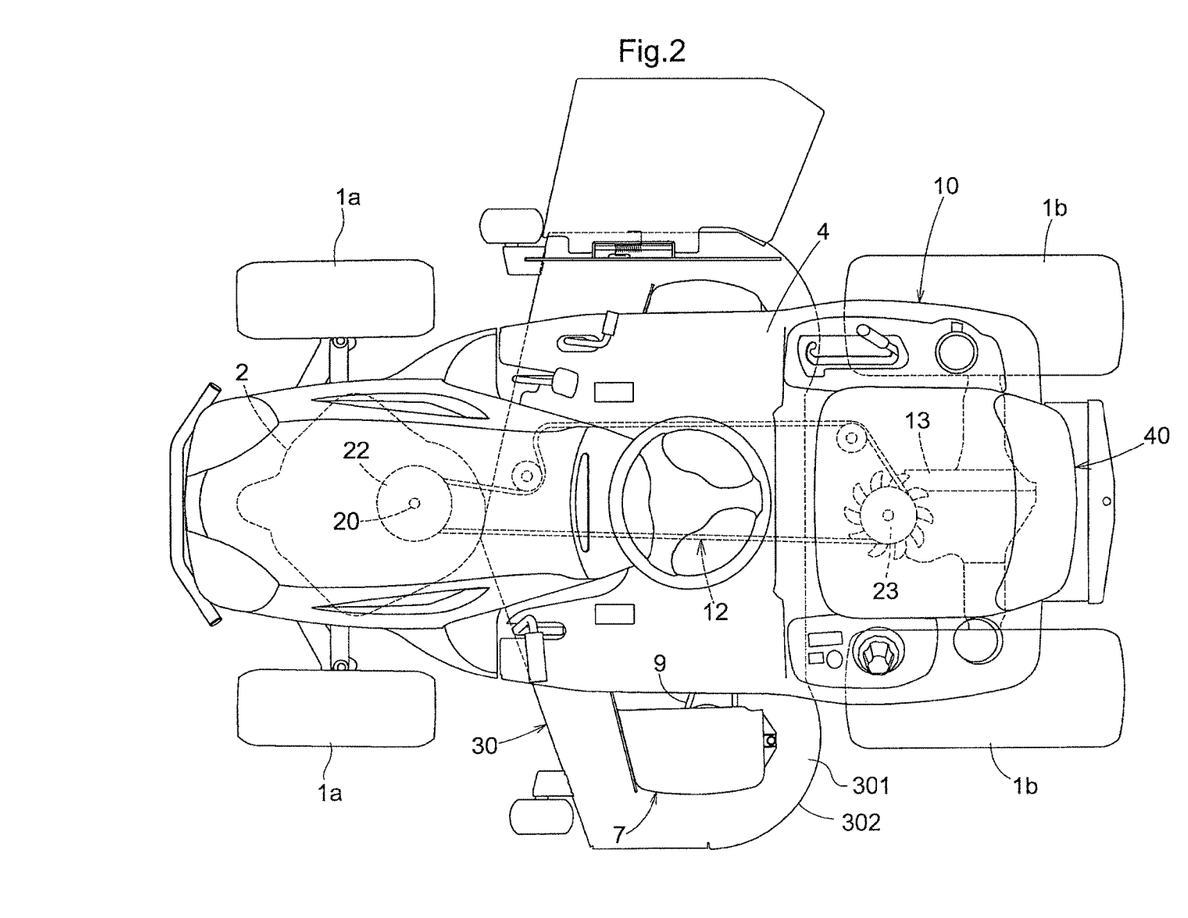
FIG. 2 is a top view of the mower machine.

As shown in FIG. 1 and FIG. 2, the grass mower vehicle includes the traveling vehicle body 10 having the steerable front wheels 1a, the non-steerable and drivable rear wheels 1b and the mower unit 3 suspended from a lower portion of the traveling vehicle body 10 between the front wheels 1a and the rear wheels 1b in such a manner that the mower unit 3 can be lifted up/down via a link type lift mechanism 11. At a front portion of the traveling vehicle body 10, a vertical shaft type engine 2 is mounted. From an output shaft 20 protruding downwards from the engine 2, a rotational power is transmitted to a transmission 13 via a traveling belt transmission mechanism 12 and transmitted also to the mower unit 3 via a mower transmission mechanism 7 as a mower belt transmission mechanism. The traveling transmission mechanism 12 and the belt transmission mechanism 7 are disposed horizontally. As shown in FIG. 2, the traveling belt transmission mechanism 12 transmits rotational power from a traveling pulley 22 attached to the output shaft 20 to an input pulley 23 provided in the transmission 13. The transmission 13 incorporates a speed changer device for changing a speed ratio in accordance with an operational amount of a speed changing tool operable by a driver. On the traveling vehicle body 10, there is disposed a floor panel 4 that extends from the rear side of the engine 2 to a region upwardly of the rear wheels 1b, and a seat 40 is provided upwardly of the rear portion of the floor panel 4.

Figure 3:
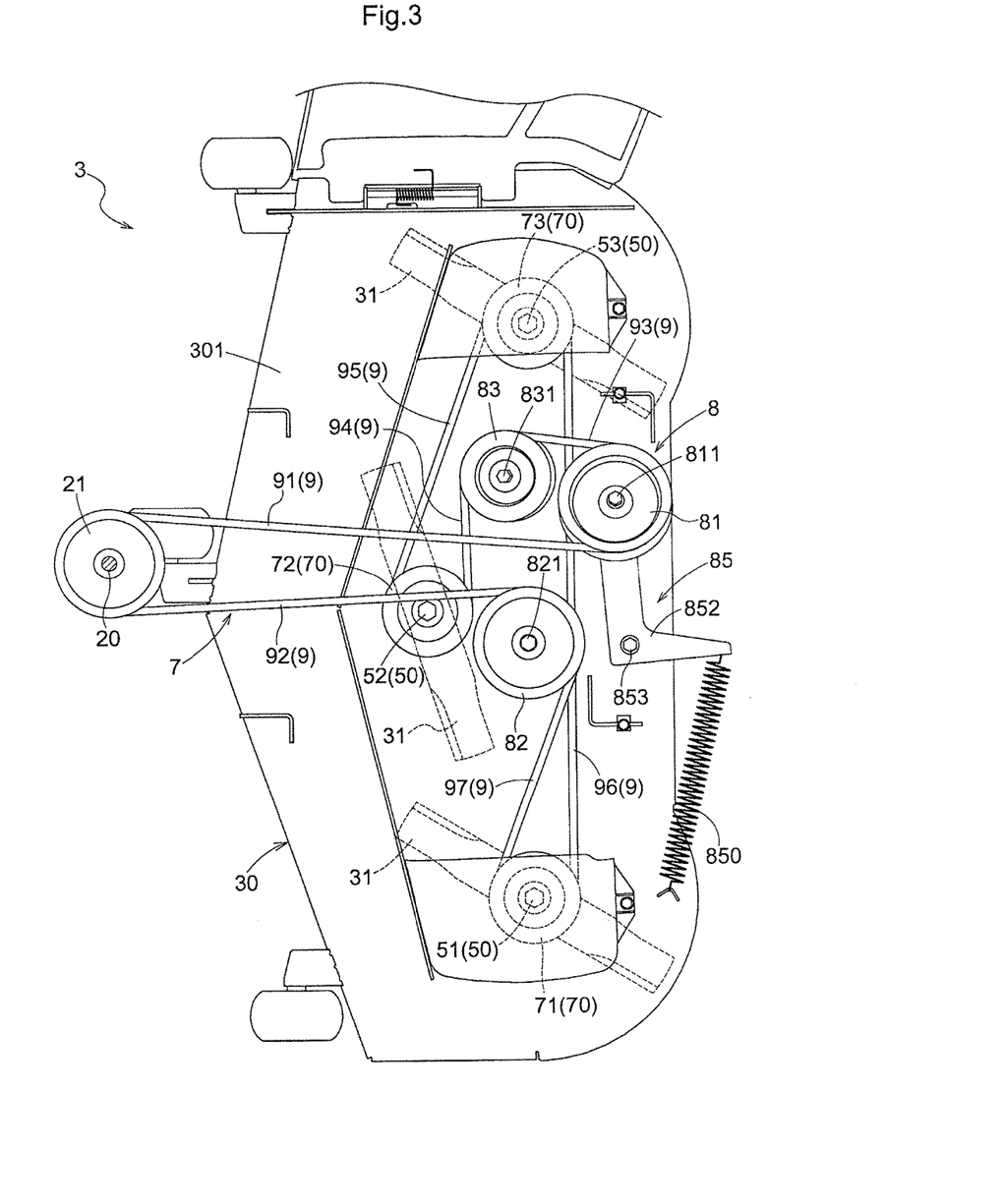
FIG. 3 is a belt layout diagram of the mower unit.
Figure 4:
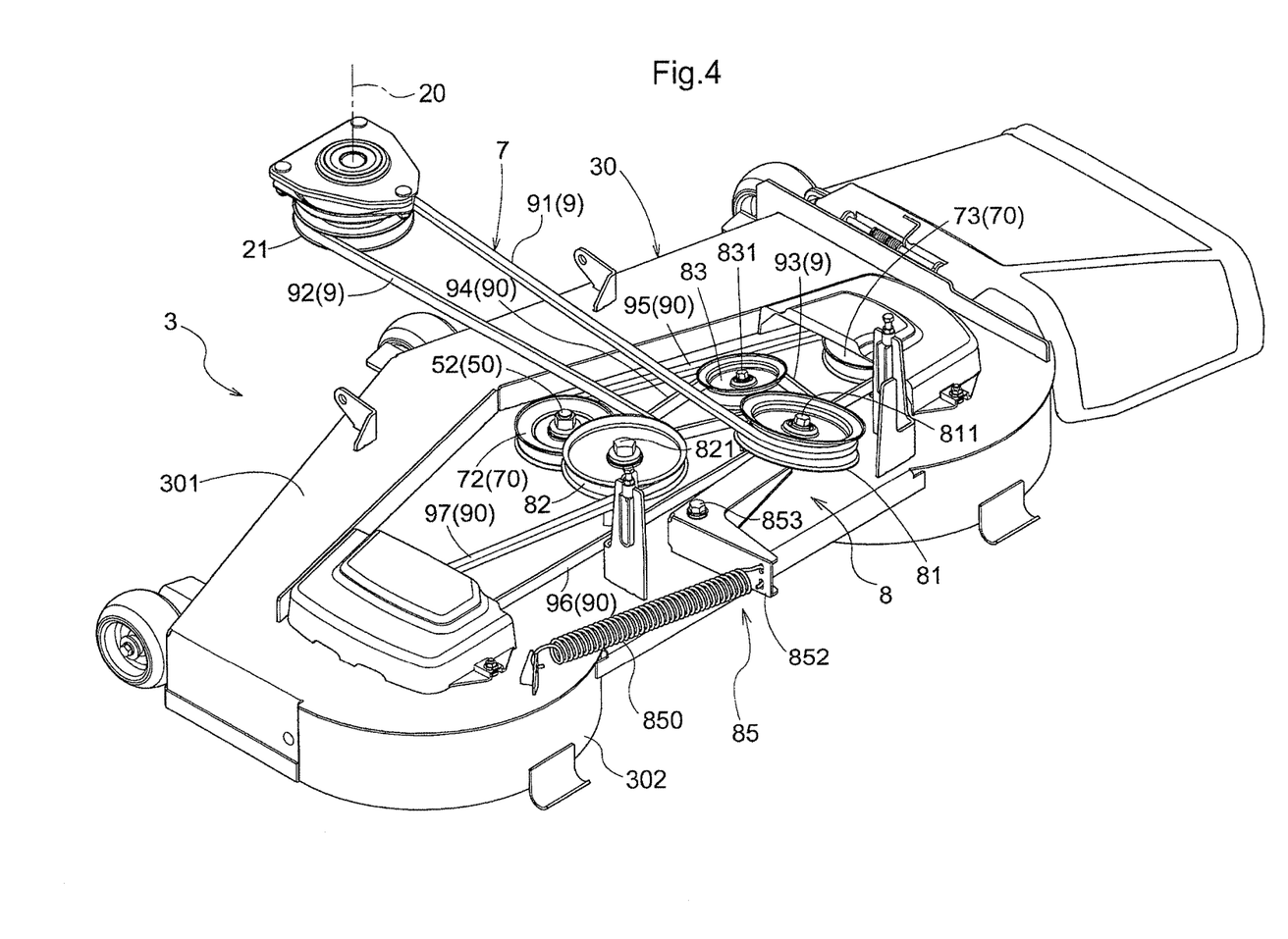
FIG. 4 is a perspective view of the mower unit.
Figure 5:
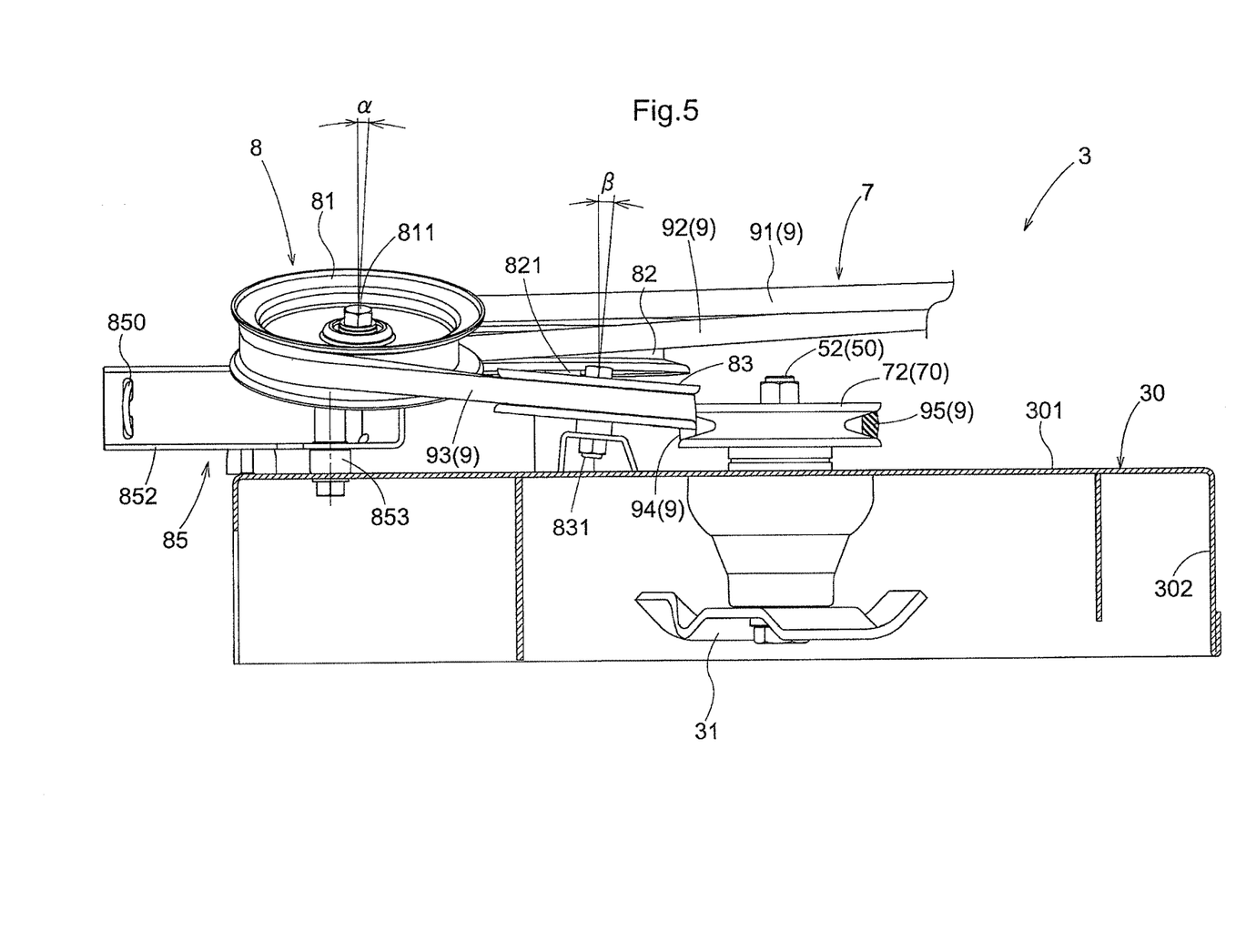
FIG. 5 is a partial section view of an idler pulley unit when the mower unit is viewed from the left side thereof.
Figure 6:
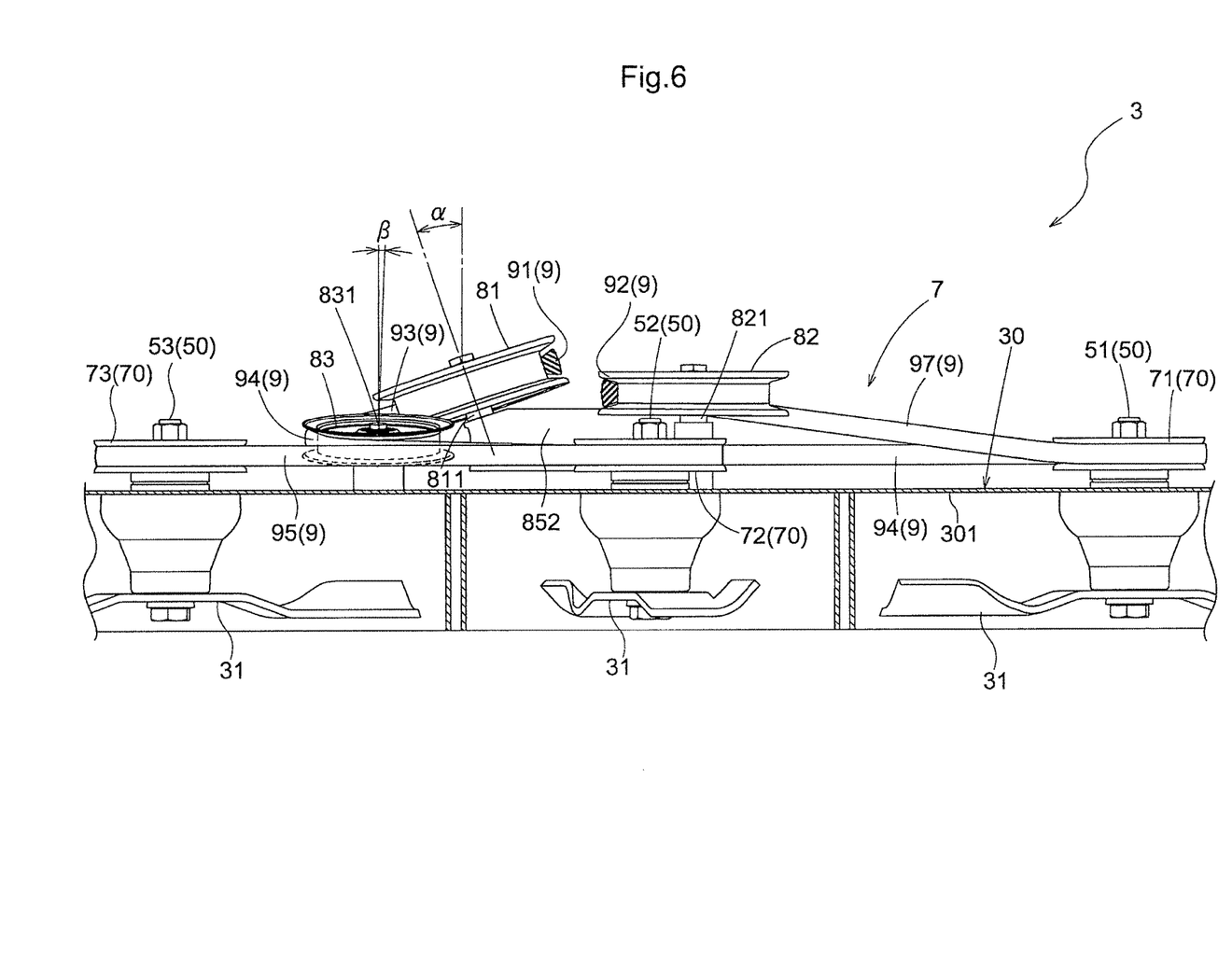
FIG. 6 is a partial section view of the idler pulley unit when the mower unit is viewed from the front side thereof.
Figure 7:
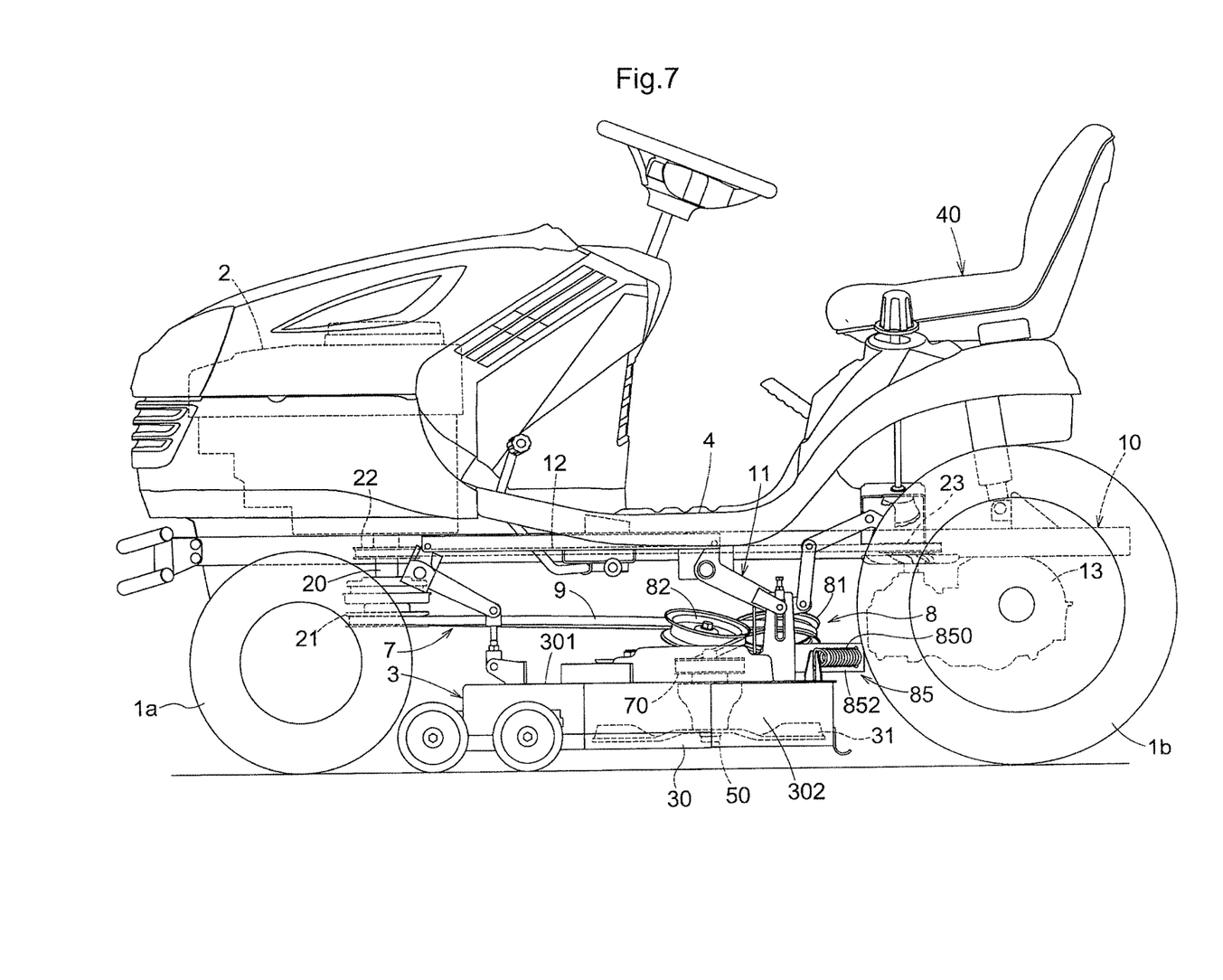
FIG. 7 is a side view showing a further embodiment of the mower machine.
Figure 8:
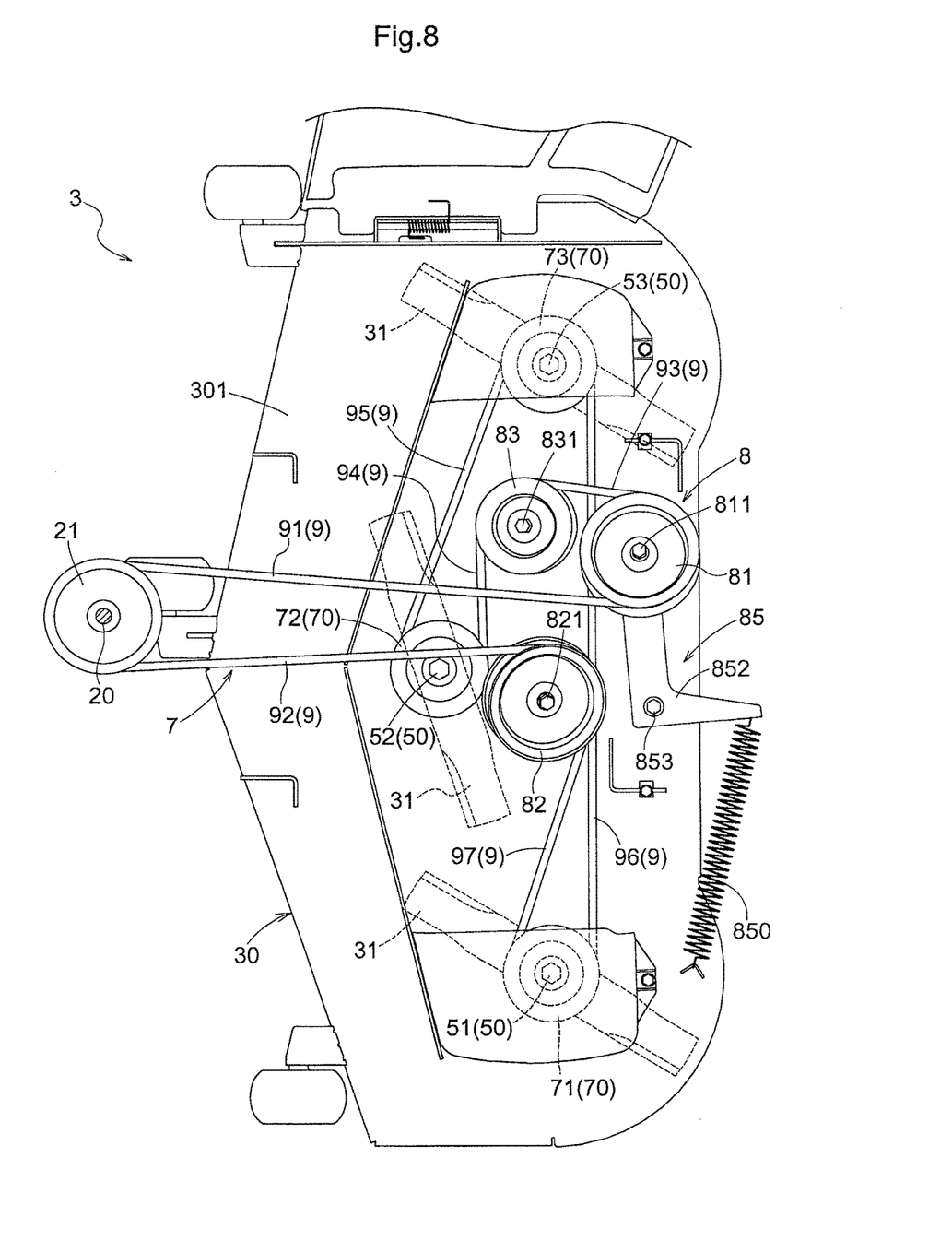
FIG. 8 is belt layout diagram of the mower machine shown in FIG. 7.
Figure 9:
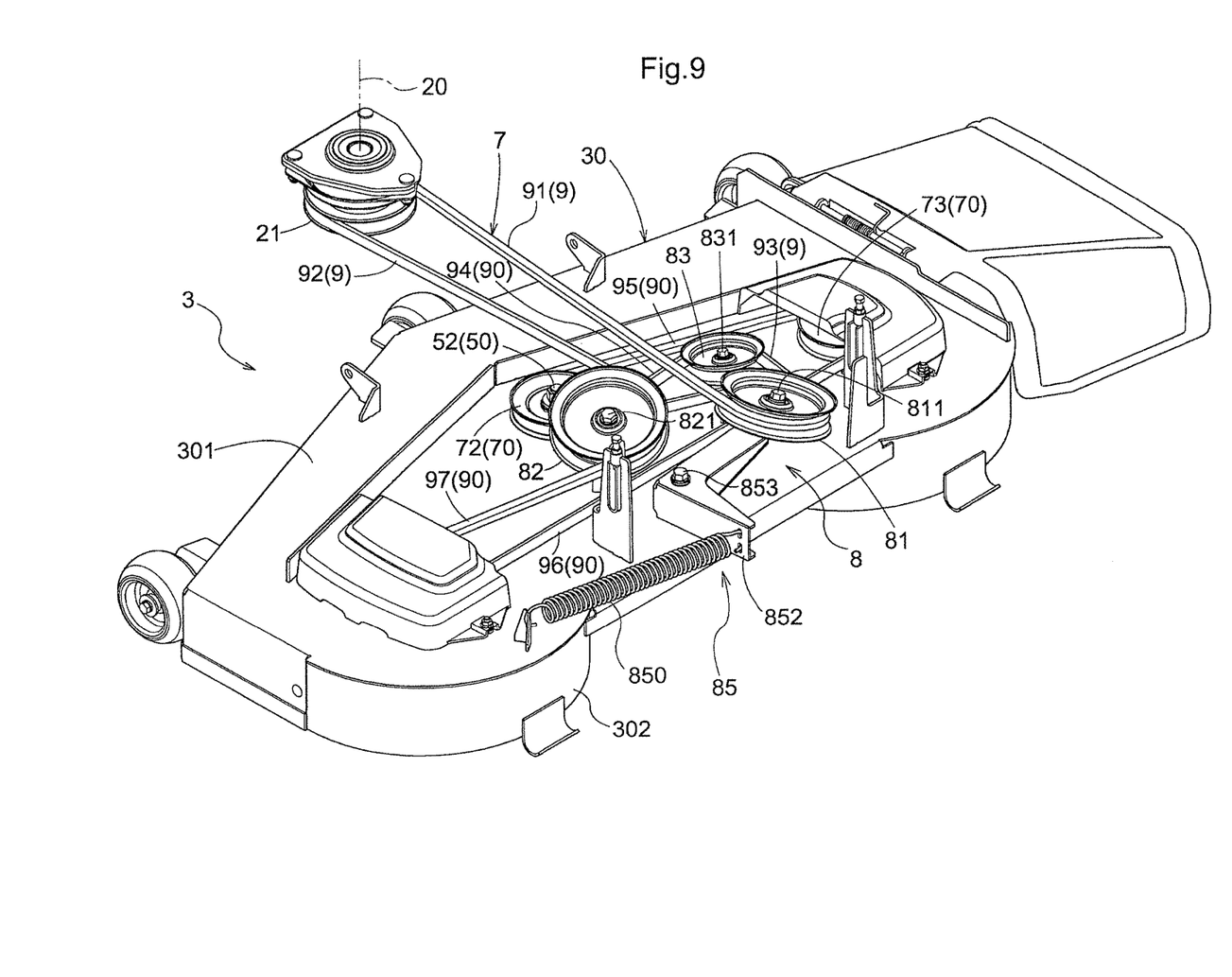
FIG. 9 is a perspective view of a mower unit of the mower machine shown in FIG. 7.

Next, a drive system for blade pulleys 70 by the belt transmission mechanism 7 will be explained with reference to the drawings. FIG. 3 shows a mower deck 30, the belt transmission mechanism 7 and a routing layout of a belt 9 in the belt transmission mechanism 7. FIG. 4 shows a perspective view of the mower unit 3. FIG. 5 is a side view in partial section showing the idler pulley unit 8 as viewed from the right side. FIG. 6 is a partial section showing the idler pulley unit 8 as viewed from the front side.

The mower unit 3 includes the mower deck 30 consisting essentially of a top plate 301 and a side plate 302. In an inside space created by the top plate 301 and the side plate 302, there are accommodated three plate-like blades 31 disposed side by side along the vehicle body transverse direction. Each blade 31 is fixed to a lower end of one of three blade rotational shafts 50 rotatably supported to the top plate 301 of the mower deck 3. Each blade rotational shaft 50 extends upward through the top plate 301 of the mower deck 30.

The blade rotational shafts 50 receive power from the output shaft 20 of the engine 2 as a drive source via the belt transmission mechanism 7. The belt transmission mechanism 7 consists of an output pulley 21 fixed to the output shaft 20, three blade pulleys 70 fixed to upper ends of the blade rotational shafts 50, an idler pulley unit 8 and the belt 9. In this belt transmission mechanism 7, the belt 9 is a single belt and this single belt 9 is routed around the output pulley 21, the blade pulleys 70 and the idler pulley unit 8.

Here, the three blade rotational shafts 50 will be referred to respectively as a first rotational shaft 51, a second rotational shaft 52, and a third rotational shaft 53 in the order from the left side. As shown in FIG. 3 and FIG. 4, to an upper end of the first rotational shaft 51, a first blade pulley 71 as a blade pulley 70 is attached. To an upper end of the second rotational shaft 52, a second blade pulley 72 as another blade pulley 70 is attached. And, to an upper end of the third rotational shaft 53, a third blade pulley 73, as still another blade pulley 70 is attached. Namely, the three blade pulleys 70 are disposed slightly upwardly of the top plate 301 and have substantially same ground heights respectively. Incidentally, the first rotational shaft 51 located on the left side of the second rotational shaft 52 and the third rotational shaft 53 located on the right side of the same are located at a substantially same position relative to the vehicle body front-rear direction. Whereas, the second rotational shaft 52 is located on a more front side in the vehicle body front-rear direction than the first rotational shaft 51 and the third rotational shaft 53.

The belt transmission mechanism 7 for transmitting engine power to the blades 31 of the mower unit 3 includes the single belt 9. The idler pulley unit 8 includes the tension idler pulley 81, a first idler pulley 82 and a third idler pulley 83. The tension idler pulley 81 has both a function of change of direction of the belt 9 and a function of application of tension to the belt 9. Whereas, the first idler pulley 82 and the second idler pulley 83 respectively have only a function of effecting change of direction of the belt 9. The tension idler pulley 81 is disposed at the center in the vehicle body transverse direction of the mower deck 30 and at the rear end in the vehicle body front-rear direction. Namely, the tension idler pulley 81 is disposed at a position more distant from the output pulley 21 than the three blade pulleys 70, the first idler pulley 82 and the second idler pulley 83. The first idler pulley 82 and the second idler pulley 83 are disposed on more forward side than the tension idler pulley 81 and at the center region of the mower deck 30.

The first blade pulley 71, the first idler pulley 82, the second idler pulley 83 and the third blade pulley 73 are disposed substantially on a straight line in the vehicle body transverse direction in the region between the second blade pulley 72 and the tension pulley 81 in the vehicle body front-rear direction. The first idler pulley 82 is rotatably supported on a pulley support shaft 821 provided in the mower deck 30 and the second idler pulley 83 is rotatably supported on a pulley support shaft 831 provided in the mower deck 30. The tension idler pulley 81 is rotatably supported on a pulley support shaft 811 provided in a movement mechanism 85. The tension idler pulley 81 is moved by the movement mechanism 85 in such a manner to increase the routing length of the belt 9, thus applying a tension to this belt 9.

The first idler pulley 82 pays out a seventh belt portion 97 as a second belt portion 92 to the output pulley 21. The tension idler pulley 81 changes direction of a first belt portion 91 paid out from the output pulley 21 in a U-shape manner and pays this out as a third belt portion 93 to the second idler pulley 83. The second idler pulley 83 changes direction of a third belt portion 93 in a direction of approximately 90 degrees and pays this out as a fourth belt portion 94 to the second blade pulley 72 which is located substantially centrally of the mower deck 30. The fourth belt portion 94 paid out from the second idler pulley 83 is routed around the second blade pulley 72. A fifth belt portion 95 paid out from the second blade pulley 72 is routed around the third blade pulley 73 and a sixth belt portion 96 paid out therefrom is routed around the first blade pulley 71 and is returned as a seventh belt portion 97 to the first idler pulley 92. The belt 9 of this belt transmission mechanism 7 is routed in a three-dimensional manner, with the first belt portion 91 passing overhead the fourth belt portion 94, the fifth belt portion 95 and the sixth belt portion 96, the second belt portion 92 passing overhead the fourth belt portion 94 and the fifth belt portion 95 and moreover the third belt portion 93 passing overhead the sixth belt portion 96. As the first idler pulley 82 is disposed upwardly of the sixth belt portion 96, the seventh belt portion 97 passes through a region higher than the sixth belt portion 96. The pulley heights (heights measured from the top plate 301 of the mower deck 30) of the tension idler pulley 81 and the first idler pulley 82 are set higher than the pulley heights of the three blade pulleys 70 (heights measured from the top plate 301 of the mower deck 30).

Incidentally, the first belt portion 91 that extends from the output pulley 21 and engages with the tension idler pulley 81 of the idler pulley unit 8 will be referred to herein as "a forward belt portion". Whereas, the second belt portion 92 that extends from the first idler pulley 82 of the idler pulley unit 8 and engages with the output pulley 21 will be referred to herein as "a reverse belt portion". Further, the third belt portion 93, the fourth belt portion 94, the fifth belt portion 95, the sixth belt portion 96 and the seventh belt portion 97 that are routed around the idler pulley unit 8 and the three blade pulleys 70 will be referred to herein as "a blade belt portion". Namely, in the three-dimensional routing of the belt 7, the forward belt portion and the reverse belt portion extend to pass over and above the blade belt portion.

The heights of the tension idler pulley 81 and the first idler pulley 82 from the top plate 301 are higher than those of the three blade pulleys 70. In order to absorb the height difference between the tension idler pulley 81 and the second blade pulley 72 located at the center, the third belt portion 93 between the second idler pulley 83 and the tension idler pulley 81 assumes a tilted posture. Similarly, In order to absorb the height difference between the first idler pulley 82 and the left blade pulley 70, the seventh belt portion 97 between the first idler pulley 82 and the left blade pulley 71 assumes a tilted posture.

In order to apply a tension to the belt 9, the movement mechanism 85 moves the tension idler pulley 81 in such a manner to increase the running length of the belt 9. In this embodiment, the movement mechanism 85 is of a pivot arm type. The tension idler pulley 81 attached to a tension arm 852 acting as a pivot arm is movable in the direction of pressing the belt 9. The force for pressing the belt 9 is obtained by a spring 850. The moving direction of the tension idler pulley 81 is the direction of exiting the mower deck 30.

The movement mechanism 85 includes the tension arm 852 in the form of a boomerang urged by the spring 850. The tension arm 852 is pivotally attached at its center portion to the mower deck 30 via a pivot shaft 853 having a vertical axis. To one end of the tension arm 852, the tension idler pulley 81 is rotatably attached. And, to the other end of the tension arm 852, one end of the spring 850 is connected. The other end of the spring 850 is fixed to the mower deck 30 via a bracket. The spring 850 extends through a rear end region of the mower deck 30 substantially along the vehicle body transverse direction. With this arrangement, the movement mechanism 85 presses the tension idler pulley 81 against the belt 9, thus applying a tension to this belt 9.

The belt transmission mechanism 7 receives power from the engine 2 via the output pulley 21 attached to the output shaft 20 downwardly of a traveling pulley 22 (see FIG. 2). As shown in FIG. 3, the belt 9 exits the output pulley 21 and then extends to be routed around the tension idler pulley 81, the second idler pulley 83, the second blade pulley 72, the third blade pulley 73, the first blade pulley 71 and the first idler pulley 82 in this mentioned order and then extends back to the output pulley 21.

As the mower unit 3 is lifted up/down relative to the traveling vehicle body 10, the height relation of the tension idler pulley 81 and the first idler pulley 82 relative to the output pulley 21 varies. Therefore, the first belt portion 91 and the second belt portion 92 experience variations of tilt thereof in association with lifting up/down of the mower unit 3. For suppressing disengaging motion of the belt possibly caused by such tilt variations, the tension idler pulley 81 and the first idler pulley 82 employed here are of diameters greater than that or those of the second idler pulley 83 or the three blade pulleys 70.

As may be apparent from FIG. 3 and FIG. 4, the sixth belt portion 96 extends through between the pulley support shaft 811 of the tension idler pulley 81 and a pulley support shaft 821 of the first idler pulley 82 and between the pulley support shaft 811 of the tension idler pulley 81 and a pulley support shaft 831 of the second idler pulley 83, thus extending substantially along the vehicle body transverse direction. The first belt portion 91 extends over and above the fourth belt portion 94, the fifth belt portion 95 and the sixth belt portion 96 in an approximately perpendicularly intersecting manner as seen in a plan view. The second belt portion 92 extends over and above the fourth belt portion 94 and the fifth belt portion 95. Under the first idler pulley 82, the sixth belt portion 96 passes. As may be apparent from FIG. 5 and FIG. 6, the heights of the tension idler pulley 81, the first idler pulley 82 and the second idler pulley 83 above the mower deck 30 (or the ground heights) are higher than the heights of the first blade pulley 71, the second blade pulley 72 and the third blade pulley 73 above the mower deck 30 (or the ground heights). The tension idler pulley 81 is disposed highest. The first idler pulley 82 is disposed higher the second idler pulley 83.

As the distance between the tension idler pulley 81 and the second idler pulley 83 is short, the length of the third belt portion 93 is short. For this reason, the tilt of the third belt portion 93 required to pass above and over the sixth belt portion 96 is large. This invites a problem of the third belt portion 93 easily disengaging from the tension idler pulley 81 and causing a load on the third belt portion 93. In order to suppress this problem, as shown in FIG. 5 and FIG. 6, the pulley support shaft 811 of the tension idler pulley 81 is tilted toward the second idler pulley 83 in the vehicle body transverse direction. Further, the pulley support shaft 831 of the second idler pulley 83 is tilted away from the tension idler pulley 81 in the vehicle body front-rear direction. With this relative tilting arrangement, the tension idler pulley 81 and the second idler pulley 82 can smoothly engage the third belt portion 93. Such tilt angles of the pulley support shafts 811 and 831 are represented by a mark α in FIG. 5 and by a mark β in FIG. 6, respectively. It is noted however that the tilt angle of the pulley support shaft 811 and the tilt angle of the pulley support shaft 831 can be different from each other or can be same.

Figure 10:
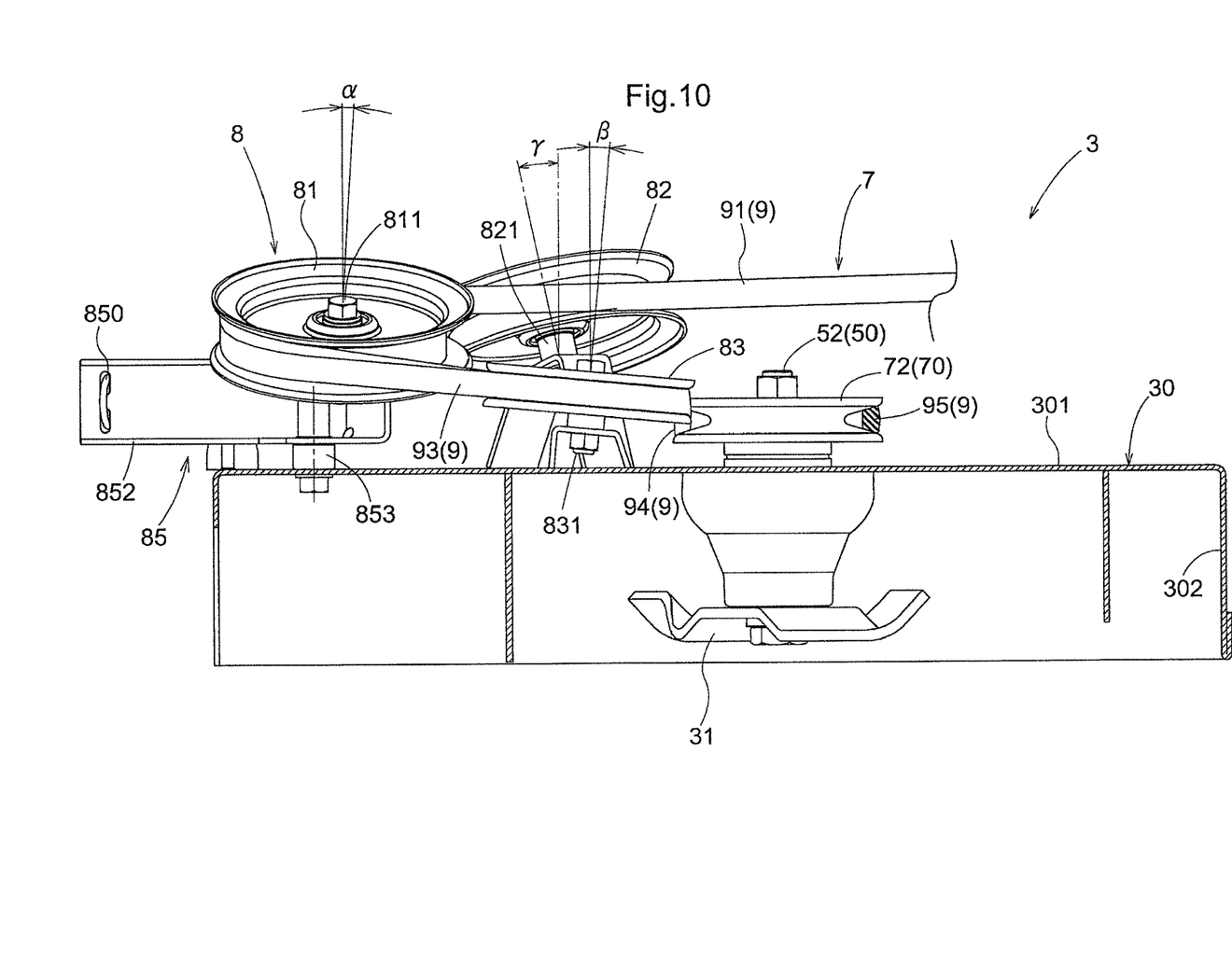
FIG. 10 is a partial section view of an idler pulley unit when the mower unit of the mower machine shown in FIG. 7 is viewed from the left side thereof.
Figure 11:
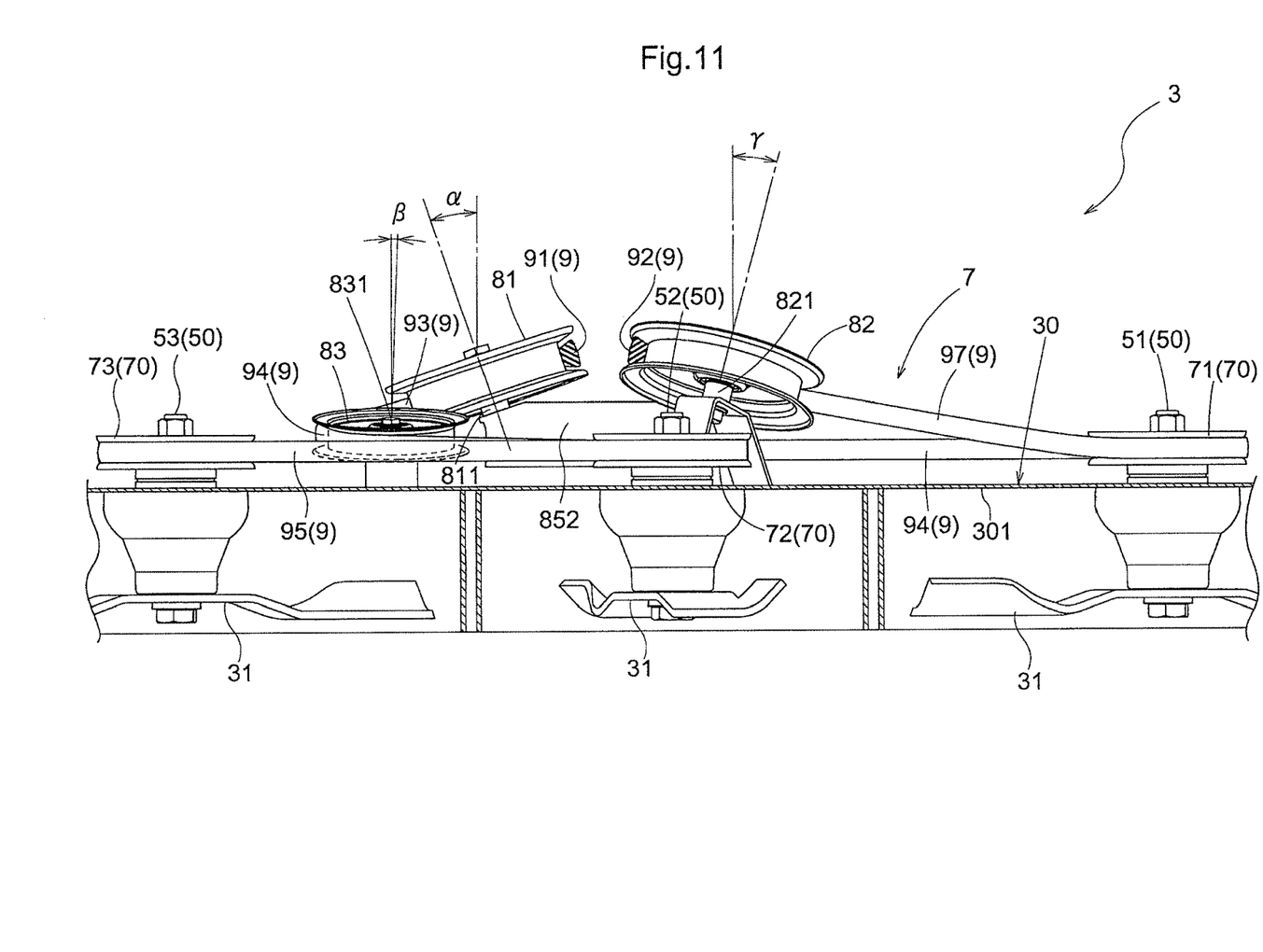
FIG. 11 is a partial section view of the idler pulley unit when the mower unit of the mower machine shown in FIG. 7 is viewed from the front side thereof.

In the foregoing embodiment, the pulley support shaft 821 of the first idler pulley 82 is not tilted substantively. Needless to say, it is also a preferred embodiment to tilt the pulley support shaft 831 of the second idler pulley 82, like the pulley support shaft 811 of the tension idler pulley 81 and the pulley support shaft 831 of the second idler pulley 83. Such embodiment of tilted pulley support shaft 831 is shown in FIGS. 7 through 11. Since the second belt portion 92 exiting the first idler pulley 82 extends over and above the second blade pulley 72, this second belt portion 92 is disposed at a higher position than the seventh belt portion 97 entering the first idler pulley 82. The pulley support shaft 821 is tilted so as to allow the seventh belt portion 97 and the second belt portion 92 to come into smooth engagement with the second blade pulley 72 smoothly, reducing its engagement load. In FIG. 10 and FIG. 11, the tilt angle of the pulley support shaft 821 is represented by a mark γ. It is noted that the tilt angle of the pulley support shaft 811, the tilt angle of the pulley support shaft 821 and the tilt angle of the pulley support shaft 831 can be different from each other or can be same. In this embodiment, the tilt angle of the pulley support shaft 811 is the largest. Whereas, the tilt angle of the pulley support shaft 821 and the tilt angle of the pulley support shaft 831 are substantially same, but the tilt angle of the pulley support shaft 821 is slightly larger.

Figure 12:
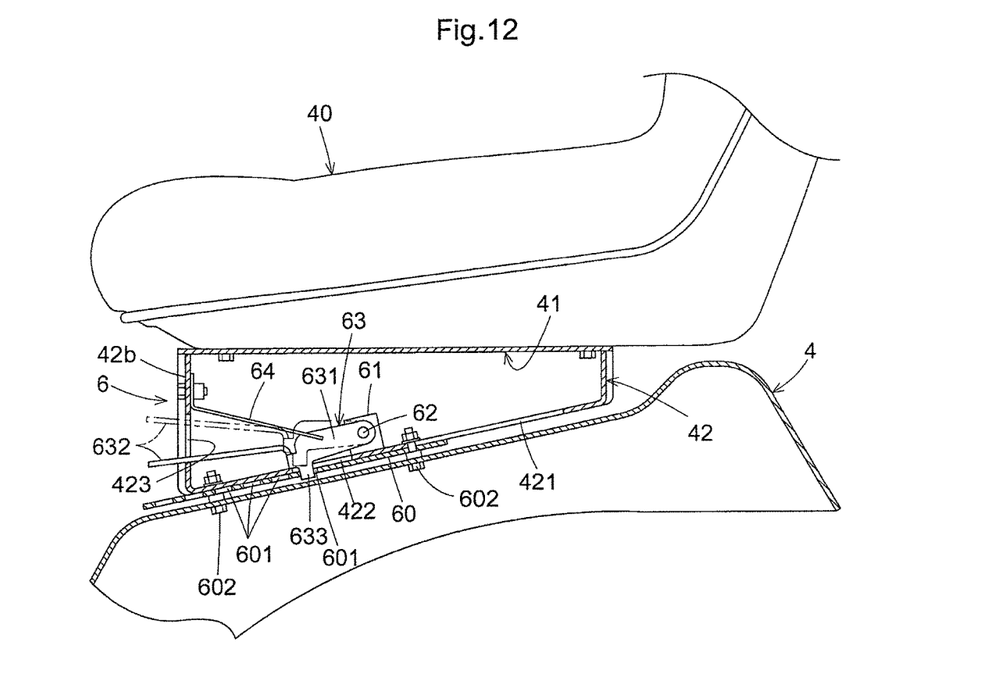
FIG. 12 is a section view showing a slide lock mechanism for a seat.
Figure 13:
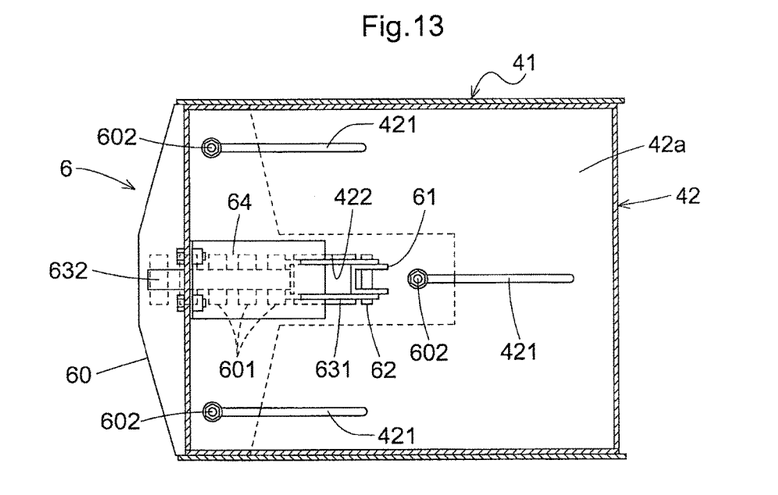
FIG. 13 is a top view of the slide lock mechanism.
Figure 14:
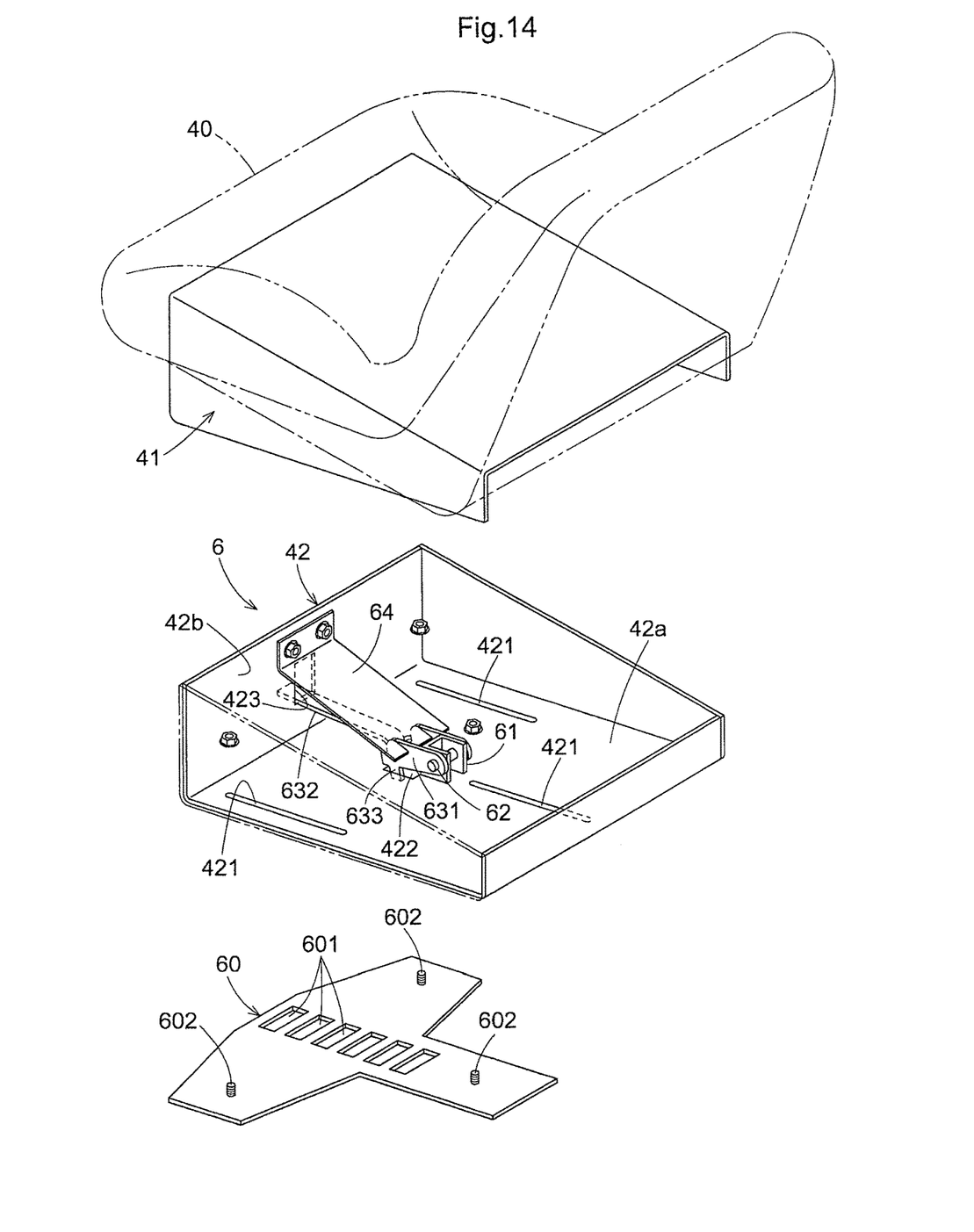
FIG. 14 is an exploded perspective view of the slide lock mechanism.

Next, with reference to FIGS. 11, 12 and 13, there will be explained a seat lock mechanism 6 for the slidable seat 40. To the back face of a seat cushion of the seat 40, an inverted U-shaped upper bracket 41 is fixed. Further, to this upper bracket 41, a U-shaped lower bracket 42 is assembled from the under thereof, so that the upper bracket 41 and the lower bracket 42 together form a quadrangular pyramid-shaped seat deck. The seat deck, namely, the seat 40, is attached to the floor panel 4 to be slidable in the front-rear direction via a slide rail mechanism which is not shown and known per se.

Between the seat 40 and the floor panel 4, there is provided the seat lock mechanism 6 for locking the seat 40 which has been slid. The seat lock mechanism 6 includes a base plate 60, a forked pivot arm 63 and a spring plate 64. The base plate 60 is fixed to the floor panel 4 and provides a sliding face for the lower bracket 42. The base plate 60 defines a plurality (six in the illustration) of quadrangular-shaped lock holes 601 along a sliding direction of the seat 40. Further, on the base plate 60, three guide pins 602 protrude vertically as "slide guides" for the lower bracket 42. And, with positional relation allowing insertion thereto of these three guide pins 602, three guide grooves 421 are defined in the lower bracket 42 along the sliding direction.

Two leg-shaped base end portions 631 of the pivot arm 63 are vertically pivotally supported to a support bracket 61 provided in the lower bracket 42, via a horizontal pivot pin 62. The pivot arm 63 includes a lock tongue piece 633 protruding downward. When the pivot arm 63 is pivoted downward, the lock tongue piece 633 passes through a through hole 422 defined in a bottom plate portion 42a (not shown) of the lower bracket 42 to be able to engage into one lock hole 601 of the base plate 60. An operational portion 632 of the pivot arm 63 extends longitudinally in form of a plate from the base end portion 631 of the pivot arm 63 and its leading end portion protrudes through a quadrangular-shaped operational guide hole 423 defined in a vertical wall portion 42b of the lower bracket 42. With this arrangement, when the pivot arm 63 is vertically pivoted with using the leading end of the operational portion 632 protruding from the operational guide hole 423, the pivot arm 63 is pivoted vertically and its lock tongue piece 633 engages into or disengages from the lock hole 601.

The spring plate 64 is a plate-like member, and one end thereof is fixed to the vertical wall portion 42b of the lower bracket 42 and the other end thereof extends over and above the operational portion 632 of the pivot arm 63 toward the base end portion 631. The spring plate 64 is attached under a downwardly tilted posture and its free end urges the pivot arm 63 in the vertical pivotal direction. Namely, the spring plate 64 maintains (locks) the engaged state of the lock tongue piece 633 within a chosen lock hole 601. When the pivot arm 63 is lifted up against the urging force of the spring plate 64 to release the lock, the slide 40 is rendered slidable. After the seat 40 is set to an appropriate position, the pivot arm 63 will be released and the seat 40 may be moved slightly as needed, whereby the lock tongue piece 633 will automatically engage into the lock hole 601, whereby the seat 40 will be locked.

As the belt 9 of the belt transmission mechanism 7, various kinds such as a V belt, a toothed belt (timing belt) can be employed. Its material is not limited to synthetic resin, but can be metal. Furthermore, the present invention does not exclude use of a chain or the like as the "belt 9". That is, the belt transmission mechanism 7 as used in the present invention is inclusive of a chain transmission mechanism also.

The mower unit 3 in the foregoing embodiment is the three blades type. However, the present invention is applicable also to two blades type, or four or more blades type. The essential feature of the present invention lies in that power transmission from the engine 2 to all of the blades 31 is effected by the single belt 9 and this belt 9 is routed in a three-dimensional layout, that is, with a certain belt portion passing over and above another or other belt portions.

In the grass mower vehicle in the above-described embodiment, the engine 2 is disposed at a front portion of the traveling vehicle body 10. Instead, the engine 2 may be disposed at a rear portion thereof Further, in the foregoing, the mower unit 3 is disposed between the front wheels 1a and the rear wheels 1b. Instead, the mower unit 3 can be disposed forwardly of the front wheels 1a.

The invention claimed is:

1. A mower unit receiving power transmitted from an output pulley of a drive source, comprising:
   a mower deck liftable up/down by a lift mechanism;
   a plurality of blade rotational shafts extending through a top plate of the mower deck perpendicularly;
   a plurality of blade pulleys mounted on the respective blade rotational shafts;
   an idler pulley unit including a first idler pulley, a second idler pulley and a tension idler pulley; and
   a single belt routed around the output pulley, the idler pulley unit and the blade pulleys, the single belt including a forward belt portion extending from the output pulley toward the tension idler pulley, a reverse belt portion extending from the idler pulley unit toward the output pulley, and a blade belt portion routed around the idler pulley unit and the blade pulleys;
   wherein a pulley height of the idler pulley unit is set higher than a pulley height of the blade pulleys, and the forward belt portion and the reverse belt portion extend to pass over and above the blade belt portion.

2. The mower unit according to claim 1, wherein a pulley support shaft of the tension idler pulley is tilted in a paying-out direction of the belt.

3. The mower unit according to claim 2, wherein a pulley support shaft of the second idler pulley is tilted in a direction away from the tension idler pulley.

4. The mower unit according to claim 1, wherein a pulley support shaft of the first idler pulley is tilted in a paying-out direction of the belt.

5. The mower unit according to claim 1, wherein the tension idler pulley and the first idler pulley are larger in diameter than the second idler pulley and the blade pulleys.

6. The mower unit according to claim 1, wherein the tension idler pulley is disposed at a position farther from the output pulley than the blade pulleys and the first and second idler pulleys.

7. The mower unit according to claim 1, wherein a movement mechanism is provided for moving the tension idler pulley toward an outer side of the mower deck so as to increase a running length of the belt in order to decrease the angle of the belt from the output pulley to the tension idler pulley at various mower deck heights.

8. A mower machine comprising a traveling vehicle body liftably mounting a mower unit for rotating a blade by a rotational power from an engine, the mower unit comprising:
   a mower deck;
   a plurality of blade rotational shafts extending through a top plate of the mower deck perpendicularly;
   a plurality of blade pulleys mounted on the respective blade rotational shafts;
   an idler pulley unit including a first idler pulley, a second idler pulley and a tension idler pulley; and
   a single belt routed around an output pulley of the engine, the idler pulley unit and the blade pulleys, the single belt including a forward belt portion extending from the output pulley toward the tension idler pulley, a reverse belt portion extending from the first idler pulley toward the output pulley, and a blade belt portion routed around the idler pulley unit and the blade pulleys;
wherein a pulley height of the idler pulley unit is set higher than a pulley height of the blade pulleys, and the forward belt portion and the reverse belt portion extend to pass over and above the blade belt portion.

9. The mower machine according to claim 8, wherein:
the forward belt portion and the reverse belt portion extend in a vehicle body front-rear direction; and
a pulley support shaft of the tension idler pulley is tilted in a direction away from the first idler pulley in a vehicle body transverse direction.

10. The mower machine according to claim 9, wherein a pulley support shaft of the first idler pulley is tilted away from the tension idler pulley in the vehicle body transverse direction.

* * * * *